(12) United States Patent
Demarquilly et al.

(10) Patent No.: US 6,497,183 B2
(45) Date of Patent: Dec. 24, 2002

(54) INFLATABLE AIR BAG RELEASE AND MEMBRANE PROTECTION DEVICE

(75) Inventors: Francis Demarquilly, Lagord (FR); Jean-Jacques Laporte, La Rochelle (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/901,668

(22) Filed: Jul. 11, 2001

(65) Prior Publication Data

US 2002/0005142 A1 Jan. 17, 2002

(30) Foreign Application Priority Data

Jul. 12, 2000 (FR) .............................. 00 09147

(51) Int. Cl.⁷ .............................................. B61D 15/00
(52) U.S. Cl. ..................... 105/392.5; 293/107; 137/69
(58) Field of Search .................. 105/26.05, 392.5; 213/220, 221, 223; 293/107; 280/728.1, 731, 732, 739; 180/271, 274; 137/67, 68.1, 68.19, 68.23, 69, 68.22

(56) References Cited

U.S. PATENT DOCUMENTS 4,289,327 A * 9/1981 Okada ......................... 137/69
5,106,137 A    4/1992 Curtis ......................... 293/107
6,247,725 B1 * 6/2001 Moller ......................... 137/69
6,321,771 B1 * 11/2001 Brazier ..................... 137/68.18

FOREIGN PATENT DOCUMENTS

| DE | 23 30745 | 1/1975 |
| FR | 2 420 456 | 10/1979 |
| GB | 2 291 244 | 1/1996 |
| GB | 2 342 332 | 4/2000 |
| WO | WO 98/13231 | 4/1998 |

* cited by examiner

*Primary Examiner*—Mark T. Le
(74) *Attorney, Agent, or Firm*—Sughrue Mion, PLLC

(57) ABSTRACT

A release device for releasing an inflatable element for protecting a vehicle against impact, which element, once inflated, presents a general shape that fits closely over the region of the vehicle to be protected, said inflatable element being held, in a folded state, in a compartment that includes a wall that is connected in sealed manner to an edge of an opening of said inflatable element, wherein, facing said opening, said wall includes gas release means that are protected during inflation of the inflatable element by a closure flap controlled by actuator means that remove said closure flap once the inflatable element is deployed.

18 Claims, 3 Drawing Sheets

INFLATABLE AIR BAG RELEASE AND MEMBRANE PROTECTION DEVICE

The invention relates both to a release device for an inflatable element for protecting a vehicle against impact, which element, once inflated, presents a general shape that fits closely over the region of the vehicle to be protected, and to a protection device for protecting a vehicle against impact, the protection device including an inflatable element provided with such a release device. The release device of the invention preferably applies to devices for providing impact protection in the rail industry, for which the inflatable protection element is particularly bulky.

BACKGROUND OF THE INVENTION

Inflatable protective cushions disposed at the front of rail vehicles, such as disclosed in publication FR 2 764 855 in the name of the Applicant, to absorb shock during impact with an obstacle, present the characteristic of being large in volume and thus requiring a very large quantity of gas to be injected under high pressure to ensure that the inflatable cushion is deployed rapidly. The inflatable cushions are provided with release orifices enabling the gas to be released progressively during impact so as to absorb the energy of the impact. Unfortunately, however, such orifices present the drawback of allowing some of the gas to escape during the stage of filling the inflatable cushion, thus contributing to further increasing the quantity of gas required to deploy the inflatable cushion.

It is known, in particular in the automobile industry, to remedy that drawback by disposing a membrane over the release orifices of the inflatable cushion so as to close said orifices during the stage of inflating the protective cushion, the membrane being designed to tear under excess pressure due to impact in order to enable the gas to be freed and the shock to be absorbed. Such a solution is disclosed in publication FR 1 571 387. However, that solution is not applicable to protective cushions for rail vehicles, which cushions are very large in volume, thereby requiring very high inflating pressures in order to obtain rapid deployment, thus causing the membranes closing the release orifices to rupture during inflation. In addition, reinforcing the membranes to prevent them from rupturing prematurely during inflation would lead to a reduction in the capacity of the inflatable cushion to absorb energy, in particular during small impacts, while increasing the pressure threshold above which the gas can escape from the cushion. Unfortunately, in order to obtain effective protection, it is important for the inflatable cushion to be properly inflated before impact and for it to relax as soon as impact occurs in order to prevent the inflatable cushion from deforming almost exclusively elastically during impact, e.g. with a human being, since it would then reaccelerate said human in the opposite direction after an impact and with a force of corresponding magnitude.

OBJECT AND SUMMARY OF THE INVENTION

The object of the present invention is thus to propose a release device, and a protection device provided with such a release device, to ensure that the protection element is inflated without loss of gas so as to optimize deployment of the inflatable element, and also to ensure that the gas is released progressively as soon as impact occurs, however violent the impact.

To this end, the invention provides a release device for releasing an inflatable element for protecting a vehicle against impact, which element, once inflated, presents a general shape that fits closely over the region of the vehicle to be protected, the inflatable element being held, in a folded state, in a compartment and including an opening having an edge that is connected in sealed manner to a wall of the compartment, wherein, facing the opening, the wall includes gas release means that are protected during inflation of the inflatable element by a closure flap controlled by actuator means that remove the closure flap once the inflatable element is deployed.

In particular embodiments, the release device can comprise one or more of the following characteristics, taken in isolation, or in any technically feasible combination:

the closure flap is actuated by pyrotechnical or electrical control means;

the release means are constituted by one or more membrane-fitted release orifices, said membrane(s) being designed to tear when excess pressure is created by an object impacting on the inflatable element; and the flap is removed after a time delay has elapsed from the initial triggering of the inflatable means.

The invention also provides a protection device for protecting a vehicle against impact, the protection device including an inflatable element which, once inflated, presents a general shape that fits closely over the region of the vehicle to be protected, the inflatable element being held in a folded state in a compartment that includes a wall that is connected in sealed manner to an opening of said inflatable element, wherein, facing the opening, the wall includes an orifice opening out to inflating means, and includes gas release means that are protected during inflation of the inflatable element by a closure flap controlled by actuator means that remove the closure flap once the inflatable element is deployed.

In particular embodiments, the release device can comprise one or more of the following characteristics, taken in isolation, or in any technically feasible combination:

the vehicle is a rail vehicle; and the inflation means are constituted by a tank of gas under very high pressure.

BRIEF DESCRIPTION OF THE DRAWINGS

The objects, characteristics, and advantages of the present invention will be better understood on reading the following description of an embodiment of the invention, given as non-limiting example, and with reference to the accompanying drawings, in which.

MORE DETAILED DESCRIPTION

To make the drawings easier to understand, only the elements necessary for understanding the invention are shown.

Figure 1:
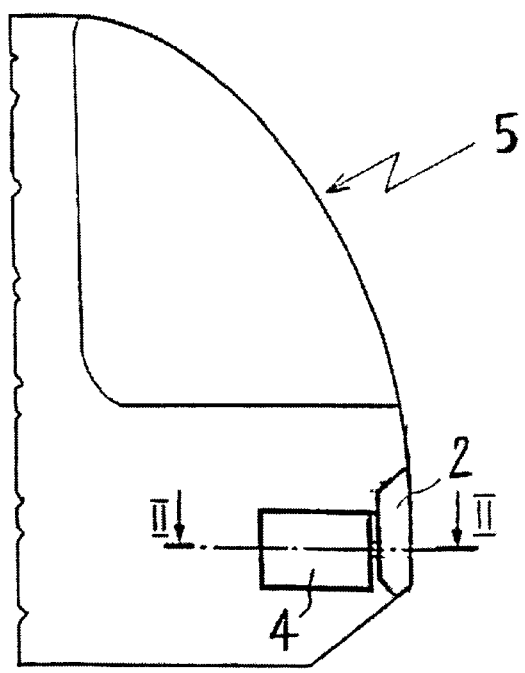
FIG. 1 is a diagrammatic side view of a rail vehicle fitted with a protection device including an inflatable cushion provided with a release device of the invention, he inflatable cushion being in a folded state
Figure 2:
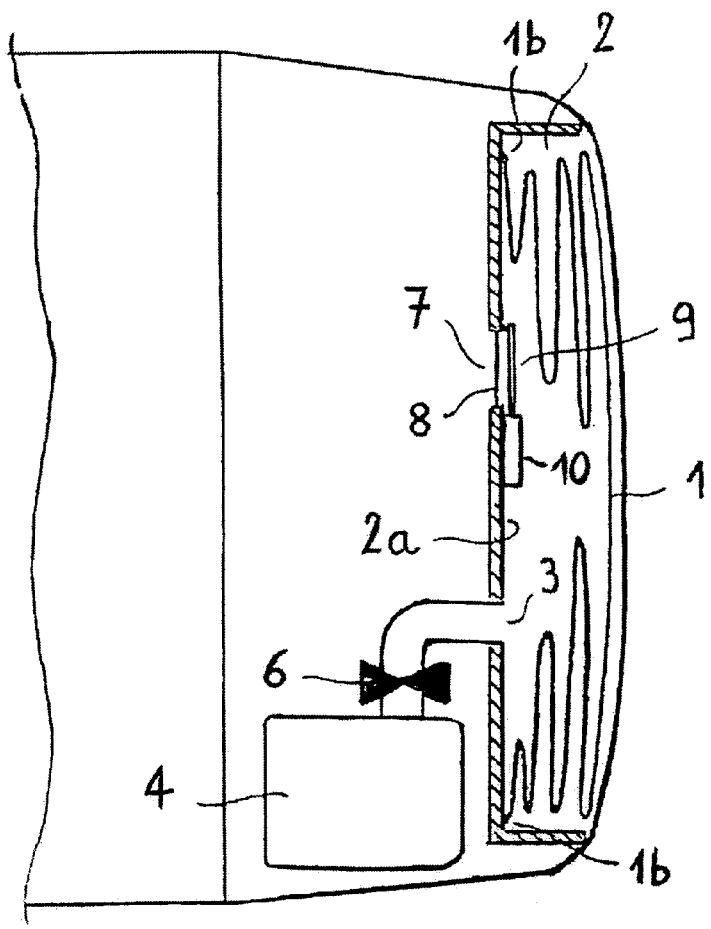
FIG. 2 is a view similar to FIG. 1, and in section on line II—II of FIG. 1.

FIGS. 1 and 2 show a rail vehicle 5 of the tram type, fitted with a protection device for protecting against impact, which protection device is constituted by a large-volume inflatable cushion 1 which, in its folded state, is stowed in a compartment 2 of the front face of the tram 5.

The inflatable cushion 1 includes an opening disposed facing the front wall 2a of the compartment 2, said opening having an edge 1b that is connected in sealed manner to a wall 2a. Facing the opening of the inflatable cushion 1, the wall 2a of the compartment includes an orifice 3 opening out to a duct connected to a tank 4 of compressed gas ensuring that the inflatable cushion 1 is put under pressure under the control of a pyrotechnically- or electrically-opening valve 6.

In FIG. 2, the wall 2a of the compartment 2 also includes a release orifice 7 putting the inside of the inflatable cushion 1 into communication with the air outside the tram 5. The release orifice 7 is closed by a membrane 8 which is protected, from inside the inflatable cushion 1, by a moving closure flap 9 connected to pyrotechnical or electrical control means 10. The closure valve 9 is shown in FIG. 2 in its closed position in which it closes the release orifice 7 in sealed manner.

The operation of the protection device associated with the release device of the invention is described below.

Under normal working conditions, the inflatable cushion 1 is in a folded state at the front of the tram 5, inside the compartment 2 provided for this purpose.

Figure 3:
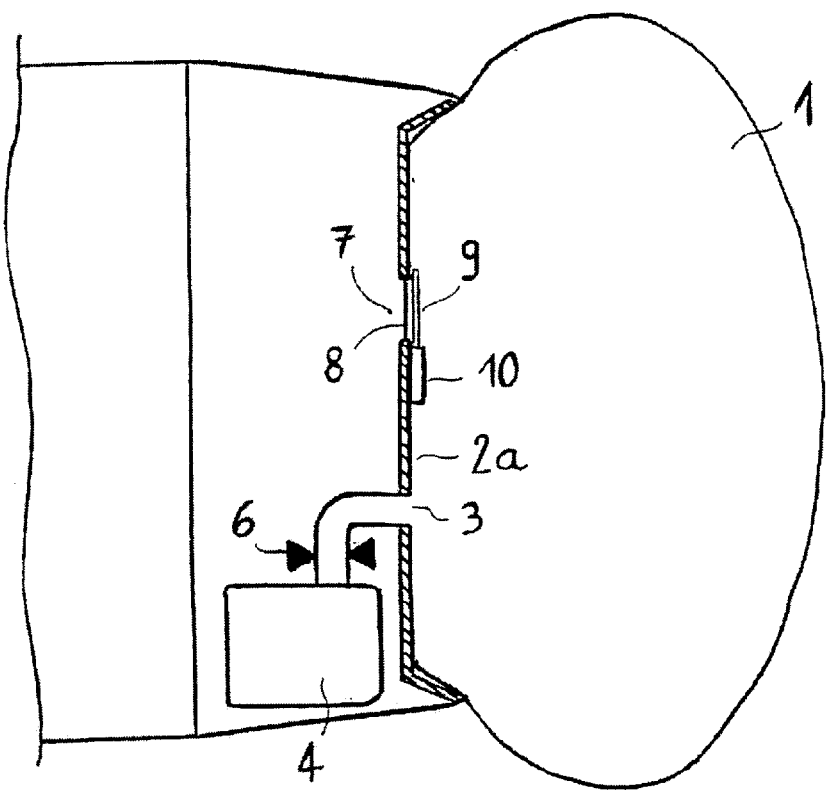
FIG. 3 is a view similar to FIG. 2 during inflation of the inflatable protective cushion.

When the risk of a collision is detected, either automatically, or following the intervention of a driver, the compressed gas in the tank 4 is suddenly injected, under high pressure and at a high rate, into the inflatable cushion 1 by opening the valve 6, as shown in FIG. 3. While the protective cushion 1 is being inflated, the closure flap 9 is kept closed so as to ensure that the inflatable cushion is gas-tight, and so as to protect the membrane 8 from the high instantaneous pressure which is generated by the sudden arrival of gas in the inflatable cushion 1 for ensuring that said cushion is deployed rapidly.

Figure 4:
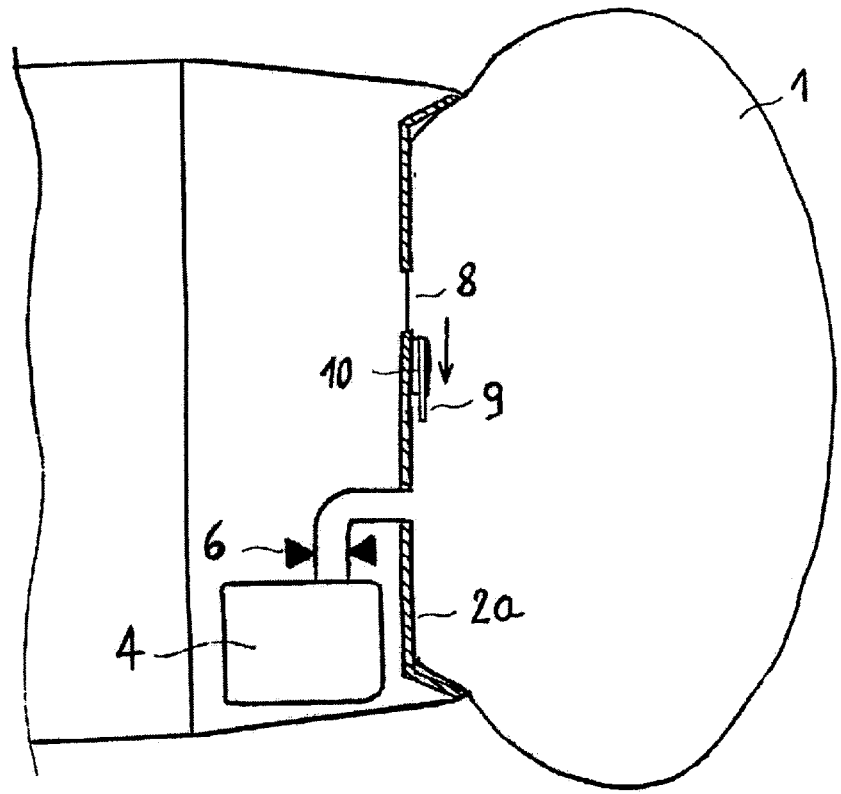
FIG. 4 is a view similar to FIG. 3, a short time later.

After a period of several tenths of a second, corresponding to the time required for completely deploying the inflatable cushion 1, a signal is sent to the control means 10 of the closure valve 9 so as to cause the flap 9 to open instantly, as shown in FIG. 4. Now the inflatable cushion 1 is in the deployed position, the pressure inside the cushion 1 is thus relatively low since the gas tank 4 has emptied, and the membrane 8 ensures that the inflatable cushion 1 is gas-tight under low pressure.

Figure 5:
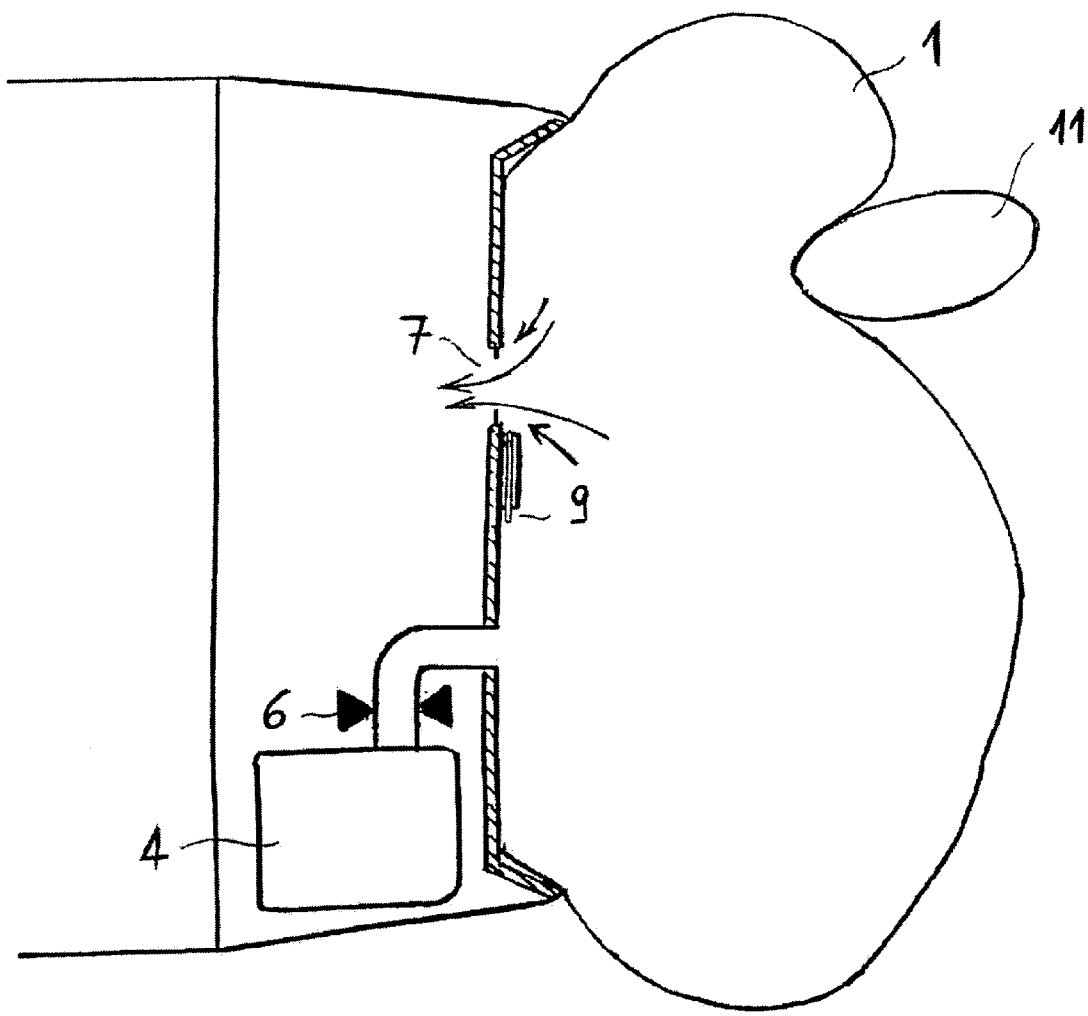
FIG. 5 is a view similar to FIG. 4 during impact.

When the tram hits an obstacle 11, the excess pressure created inside the inflatable cushion 1 thus causes the membrane 8 to rupture instantly, thereby enabling the gas contained in the cushion 1 to be expelled progressively towards the outside via the release orifice 7, and thereby enabling the impact to be absorbed, as shown in FIG. 5.

Such a release device fitted to a protection device thus enables the inflatable element to be inflated very quickly as a result of the very high pressure and very high flow rate of gas which can be used to cause the deployment of the inflatable element without the risk of gas escaping via the release orifice(s). Once the inflatable element is deployed, the pressure stabilizes at a low value, so the membrane closing the release orifice thus ensures that the inflatable element is properly maintained until impact, thus preventing said inflatable element from deflating before impact, thereby losing its damping capacity. Since the membrane closing the release orifice is dimensioned to tear at small excess pressure, said membrane ruptures as soon as impact occurs, thereby enabling objects having low inertia to be absorbed without any risk of rebounding.

In addition, keeping the inflatable element gastight during inflation also enables a tank of smaller volume to inflate the protective element, and thus enables the weight and bulk of the tank to be reduced, thereby constituting a significant advantage.

What is claimed is:

1. A release device, for releasing an inflatable element for protecting a vehicle against impact, comprising:
    a. a gas release orifice, forming a gas release opening of said inflatable element, covered by a membrane;
    b. a movable closure flap protectively covering said membrane; and
    c. an actuator device that moves said closure flap relative to said membrane.

2. A release device according to claim 1 for releasing an inflatable element for protecting a vehicle, wherein said actuator device is a pyrotechnical device.

3. A release device according to claim 1 for releasing an inflatable element for protecting a vehicle, wherein said gas release orifice is constituted by more than one membrane-fitted release orifice.

4. A release device according to claim 1 for releasing an inflatable element for protecting a vehicle, wherein said closure flap is removed after a time delay has elapsed from the initial triggering of the inflatable means.

5. A protection device for protecting a vehicle against impact, comprising:
    a. a compartment comprising a wall;
    b. an inflatable element including an opening, said inflatable element being held in a folded state and said opening being connected in a sealed manner to said wall of said compartment,
    c. wherein, facing said opening, said wall includes an orifice opening out to a means for inflating said inflatable element, and includes a gas release device according to claim 1, and
    d. wherein said inflatable element, once inflated, presents a general shape that fits closely over a region of the vehicle to be protected.

6. A protection device according to claim 5, wherein said vehicle is a rail vehicle.

7. A protection device according to claim 6, wherein said means for inflating is constituted by a tank of gas under high pressure.

8. A release device according to claim 1 for releasing an inflatable element for protecting a vehicle, wherein said actuator device is an electrical device.

9. A release device, for releasing an inflatable element for protecting a vehicle against impact, comprising:
    a. a gas release orifice, forming a gas release opening of said inflatable element, covered by a membrane;
    b. a movable closure flap protectively covering said membrane; and
    c. said closure flap controlled by a means for moving said closure flap in relation to said membrane.

10. A release device, for releasing an inflatable protection element, comprising:
    a. a gas release orifice, forming a gas release opening of said inflatable element, covered by a membrane;
    b. a movable closure flap protectively covering said membrane; and
    c. said closure flap controlled by a means for moving said closure flap in relation to said membrane.

11. A release device, for releasing an inflatable protection element, comprising:

a. a gas release orifice, forming a gas release opening of said inflatable element, covered by a membrane;

b. a movable closure flap protectively covering said membrane; and c. an actuator device that moves said closure flap relative to said membrane.

12. A release device according to claim 11 for releasing inflatable protection element, wherein said actuator device is a pyrotechnical device.

13. A release device according to claim 11 for releasing an inflatable protection element, wherein said actuator device is an electrical device.

14. A release device according to claim 11 for releasing an inflatable protection element, wherein said gas release orifice is constituted by more than one membrane-fitted release orifice.

15. A release device according to claim 11 for releasing an inflatable protection element, wherein said closure flap is removed after a time delay has elapsed from an initial triggering of the inflatable element.

16. An inflatable protection element according to claim 11, wherein said inflatable protection element is incorporated into a passenger compartment of a motor vehicle.

17. An inflatable protection element according to claim 11, wherein said inflatable protection element is incorporated into a passenger compartment of a rail vehicle.

18. An inflatable protection element according to claim 11, wherein said inflatable element is deployed by a tank of gas under high pressure.

* * * * *